(12) United States Patent
Iun et al.

(10) Patent No.: US 8,818,444 B2
(45) Date of Patent: Aug. 26, 2014

(54) METHOD AND SYSTEM FOR PROVIDING WIRELESS BASE STATION RADIO WITH NON-DISRUPTIVE SERVICE POWER CLASS SWITCHING

(75) Inventors: Edwin Iun, Ottawa (CA); Robert Griffioen, Ottawa (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 13/554,368

(22) Filed: Jul. 20, 2012

(65) Prior Publication Data

US 2014/0024325 A1 Jan. 23, 2014

(51) Int. Cl.
*H04W 88/00* (2009.01)
*H04B 7/04* (2006.01)
*H04B 7/005* (2006.01)

(52) U.S. Cl.
CPC .............. *H04B 7/005* (2013.01); *H04B 7/0408* (2013.01)
USPC ........................................... 455/522; 455/69

(58) Field of Classification Search
CPC ........ H04B 7/005; H04B 7/007; H04B 7/022; H04B 7/028; H04B 7/0408; H04W 52/367
USPC ................ 455/422.1, 450, 452.1, 452.2, 446, 455/63.1, 67.11, 69, 522
See application file for complete search history.

(56) References Cited

U.S. PATENT DOCUMENTS

| | | | |
|---|---|---|---|
| 6,463,050 B1 | 10/2002 | Nagashima | |
| 7,092,714 B2* | 8/2006 | Noll et al. | 455/63.1 |
| 2007/0149237 A1 | 6/2007 | Russell et al. | |
| 2010/0009694 A1 | 1/2010 | Fischer | |
| 2012/0071196 A1* | 3/2012 | Bergman | 455/522 |
| 2012/0196611 A1* | 8/2012 | Venkatraman et al. | 455/450 |

FOREIGN PATENT DOCUMENTS

| | | | |
|---|---|---|---|
| EP | 2439988 A1 | 4/2011 | |
| EP | 2360975 A1 | 8/2011 | |

OTHER PUBLICATIONS

Feng, Sujuan et al., "Self-Organizing Networks (SON) in 3Gpp Long Term Evolution", Novel Mobile Radio, May 20, 2008 (pp. 1-15) Munich, Germany.

* cited by examiner

*Primary Examiner* — Thanh Le
(74) *Attorney, Agent, or Firm* — Jean-Pierre Fortin; Ericsson Canada Inc.

(57) ABSTRACT

A system and method of implementing an on-demand change of the RF power class of multi-carrier power amplifiers at a base station radio with minimal disruption of user service is disclosed. The power amplifiers providing signal diversity at said cell site and being able to operate at various RF power class levels. A first multi-carrier power amplifier with multiple RF Power Classes provides a main RF beam transmission at one sector of said cell site. A second multi-carrier power amplifier with multiple RF Power Classes provides RF beam transmission diversity to the main RF beam transmission. A switch operates to disable either the first or second multi-carrier power amplifier when an RF Power class change is required.

13 Claims, 5 Drawing Sheets

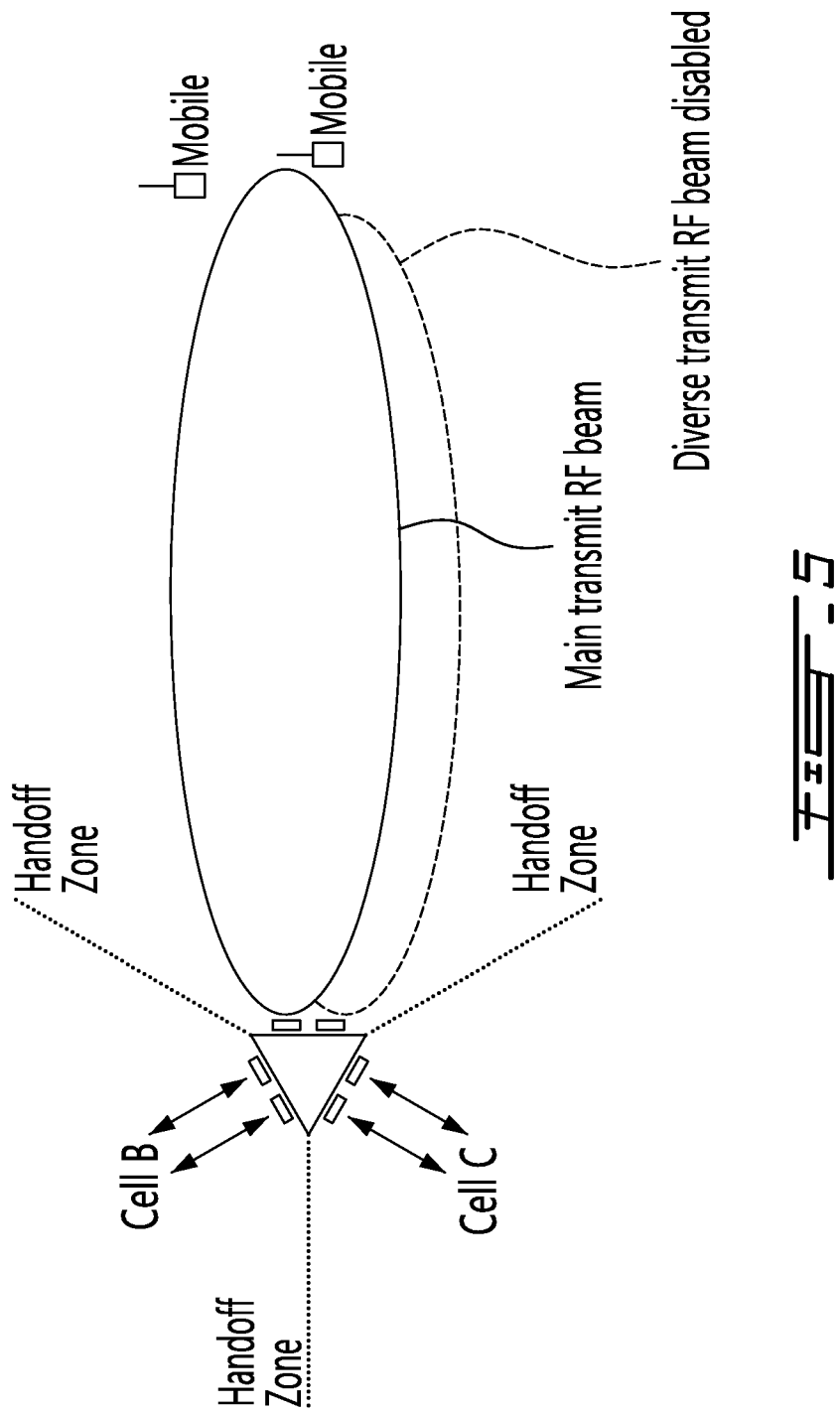

METHOD AND SYSTEM FOR PROVIDING WIRELESS BASE STATION RADIO WITH NON-DISRUPTIVE SERVICE POWER CLASS SWITCHING

FIELD OF THE INVENTION

The present application relates generally to radio base stations with signal diversity, more specifically, to radio base stations having radios able to operate on multiple RF power classes.

BACKGROUND OF THE INVENTION

A cellular base station typically consists of a radio equipment controller (REC) connected to one or more radio equipment (RE) units.

Generally these radios operate at the maximum transmit power levels. This is because RF multi carrier power amplifiers (PA) are designed to be most efficient at the maximum output power. When the PA is operated at lower transmitter output to save base station power, then the efficiency drops rapidly and the output becomes less linear.

Base station radio's power amplifiers typically use a Doherty design which is roughly 55%-65% efficient at the amplifier's optimal output. As the PA output is reduced, the overall power savings is much less than expected because of this reduced efficiency.

Base station radios can be designed to operate in one of multiple RF power classes. Power Class is a set of radio calibration parameters designed for an anticipated output power; such that when the radio is operating in that output power level this set of parameters do warrant a maximal power efficiency. Therefore each radio contains an array of power class to cover the expected operating range of the radio. This makes it possible to operate in low or high RF power output modes depending on the network coverage requirements. Low power modes are useful during off hour operation or in dense urban areas where cell site is small. High power modes are required for operation in rural areas or to support high bandwidth applications.

The base station radio's can be designed to operate in multiple RF output power classes for example 5, 10, 20, 40, and 80 watts. To achieve this, the radio's power amplifiers have to be re-configured to switch over the settings associated with each RF power class.

Currently base station radios switch power mode class by shutting off all the RF paths simultaneously as the RF power amplifiers are re-configured to operate at the new power class. This cut over induces a temporary outage thus is carefully managed especially during system operation. A power class change requires altering the power amplifiers' voltage bias to operate at the new transmit power level. The mobiles in this sector would see an abrupt outage and would start hunting for a new radio signal. This outage could last a number of seconds while the radio's power amplifier ramps up and the pre-distortion compensation is re-computed for the new output level.

Thus, on the one hand if a power amplifier is to remain in operation while reducing its power, the efficiency suffers drastically and the spurious RF emissions are increased. On the other hand, the amplifier's power class can be set lower to increase efficiency but this requires that the amplifier be shut off.

For these reasons, traditional power reduction implementations have limited capabilities in situations as described above.

SUMMARY OF THE INVENTION

The present invention is directed to alleviating the problems of the prior art.

The present invention overcomes the problems of the prior art by providing a base station radio having a number of multi-carrier power amplifiers to provide signal diversity at a cell site. The base station radio is operable to provide on-demand RF Power class change. A first multi-carrier power amplifier with multiple RF Power Classes provides a main RF beam transmission at one sector of the cell site. A second multi-carrier power amplifier with multiple RF Power Classes provides RF beam transmission diversity to the main RF beam transmission. A switch is operable to disable either the first or second multi-carrier power amplifier when an RF Power class change is required.

In a further embodiment, the present invention provides a method of implementing an on-demand change of the RF power class of multi-carrier power amplifiers at a base station radio operating at a cell site. An RF power class change request is sent to the base station radio. To enable a change to a new RF power class for the first power amplifier, power is switched off at the first power amplifier. When the first power amplifier is set at the new RF power class, power is then switched on. Power is then switched off at a second power amplifier providing transmission diversity with the first power amplifier to enable a change to the new RF power class. Power is then switched back on at the second power amplifier when set at the new RF power class.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 5 illustrates the signal coverage at a cell site when the power amplifier of a diverse branch is turned off to adjust the RF power class.

DETAILED DESCRIPTION OF THE EMBODIMENTS

Figure 1:
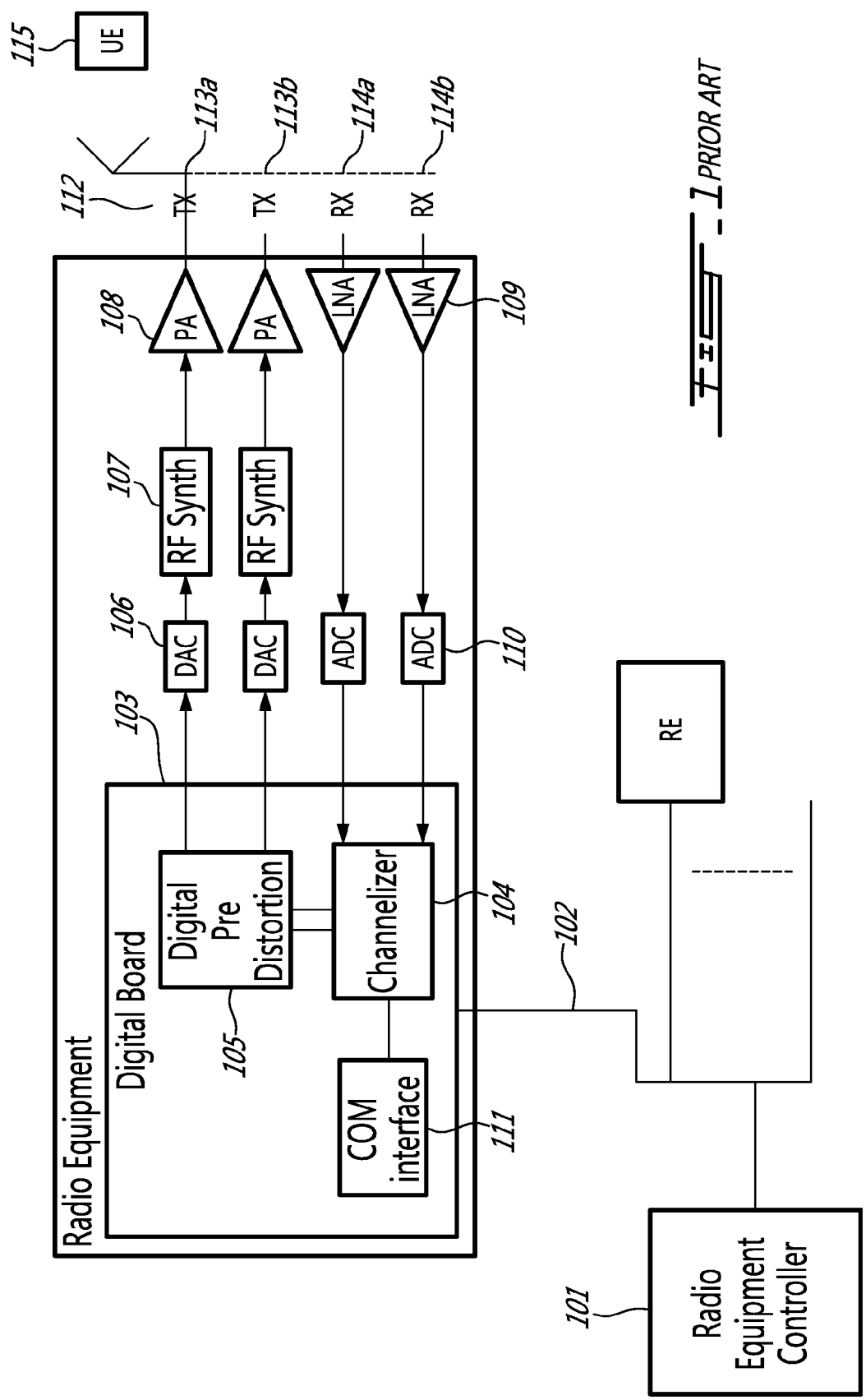
FIG. 1 is a block diagram illustrating of a typical radio base station providing signal diversity.

In order to lighten the following description, the following acronyms will be used:
ADC Analog-to-digital Converter
CPRI Common Public Radio Interface
DAC Digital-to-analog Converter
LNA Low Noise Amplifier
PA Power Amplifier
REC Radio Equipment Control
RE Radio Equipment
RX Receive
TX Transmit With reference to FIG. 1, we have shown a block diagram illustrating a typical wireless base station radio offering signal diversity.

Cellular network base station radios are designed to be either cabinet mounted (RE) with the Radio Equipment 100 Controller (REC) 101 or at a remote site (RRE). The REC 101 includes a modem block (not shown) which modulates and demodulates the wireless network data into a form termed baseband data. A CPRI link 102 between the REC 101 and the RE 100 carries this baseband data in the CPRI's User Plane. Information at this baseband data layer is encapsulated inside antenna carrier (A×C) blocks inside the CPRI frame.

The radio has a digital board 103 which on the transmit path has a channelizer 104 to multiplex the downlink AxCs onto the assigned carriers. This digital signal is then pre-distorted 105 to compensate for the RF power amplifier's non-linearity. The digital signal is converted to analog (DAC) 106 before RF synthesizing 107 and amplifying it 108. The multi carrier power amplifier (PA) 106 typically accounts for 50-75% of the radio's power consumption.

On the receive path the low noise amplifiers (LNA) 109 boosts the received signal before converting it to a digital signal (ADC) 110. The radio board's channelizer 104 then de-multiplexes the received signals into the AxCs sent back to the REC 101 on the uplink via the COM interface 111.

The RE 102 amplifies the baseband signal from the REC 101 and transmits it over the antenna system 112. When the radio supports transmit diversity, the same modulated carrier is transmitted over two or more separate antenna systems 113a and 113b and whereas with received diversity, the radios receive over two or more separate antenna systems 114a and 114b. Multiple antennas provide a more robust link to the mobiles. When one path is experiencing a deep fade the other path could be operating at normal signal strength. These antennas usually have the same characteristics and are physically separated from one another by a planned distance as a function of carrier wavelength.

The Power Amplifier unit makes the final amplification of the down link analog signal from the radio's digital section. To optimize on power efficiency and bandwidth an asymmetric Doherty design is typically used in the base station radio using Multi-Carrier Power Amplifiers.

The asymmetric Doherty PA design improves the power efficiency over a conventional Class AB amplifier. Both the main and peak RF signals are amplified in three cascaded amplifier stages. The two paths are not identical in the power amplifier; the final stage in the peak path consists of a parallel stage, while the final stage in the main path has one single transistor. The two paths are combined after the final stage. A directional coupler detects the amplified signal which is passed to the Transmitter Observer Receiver (TOR). A single circulator module at the output will protect the PA from excessive reflected power. What should be noted is that PA efficiency drops off rapidly as the output power is reduced below the optimal operating point when an asymmetrical Doherty amplifier is used.

As indicated above, the base station radio has multiple transmit 113a, 113b and receive antennas 114a, 114b, which provides diversity in both directions. In FIG. 1, the radio (RE) 102 is connected to dual antennas transmitting to multiple mobiles or User Equipment (UEs) 115.

Figure 2:
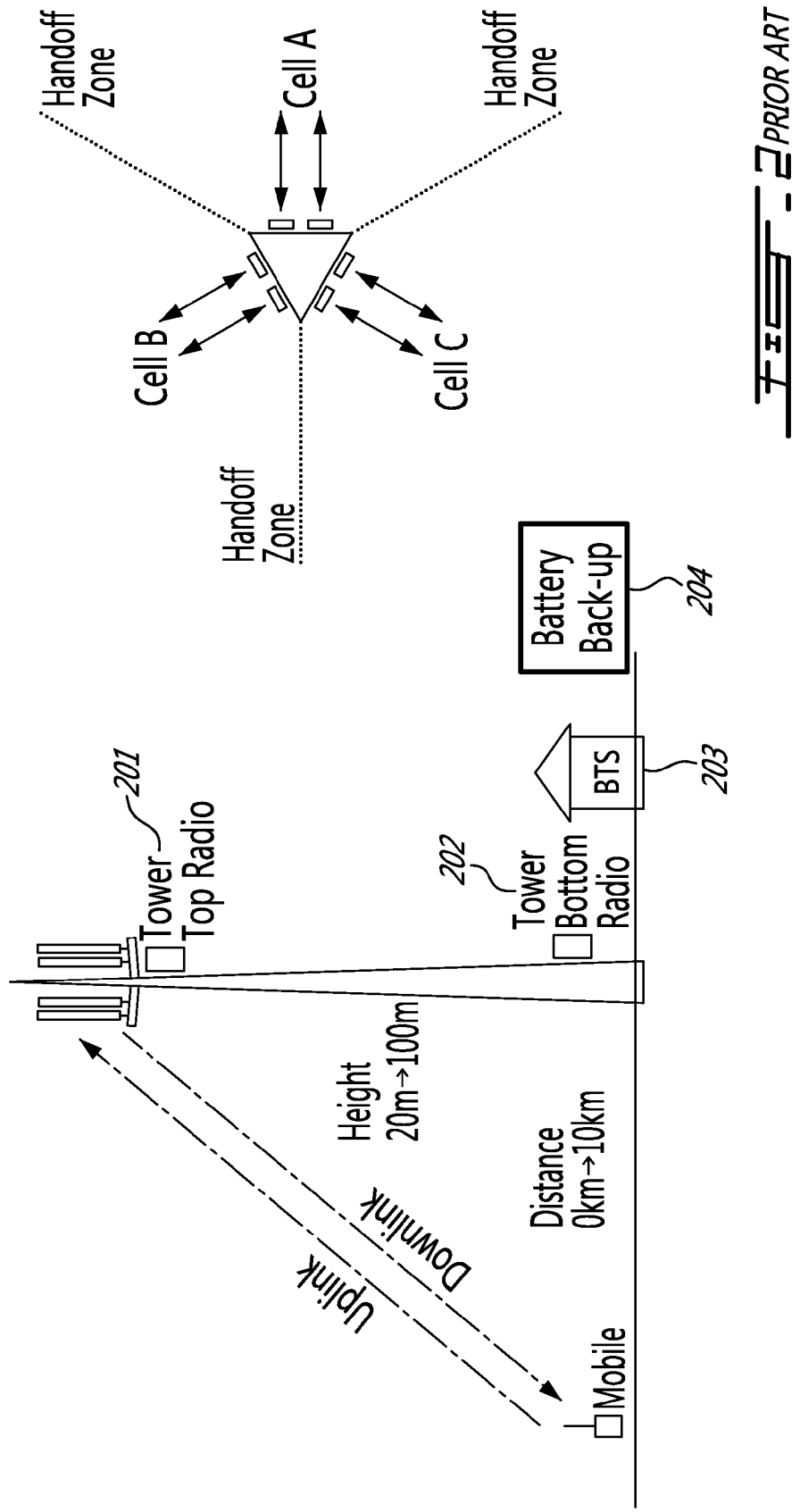
FIG. 2 is a block diagram illustrating the basic cell site configuration for a base station such as shown in FIG. 1.

Typically base station radios are deployed with high gain antennas with advanced directivity to cover a sector. These antennas are either mounted at the top of the tower 201 or bottom mounted 202, as shown in FIG. 2.

Radio waves obey the inverse square law, so as an example when the transmit power density is halved the maximum operating distance to the receivers is reduced by a factor of four assuming other factors such as ambient noise remains constant.

When the PA operates below its optimal power level as discussed above, it operates at reduced efficiency.

Base station radios are designed to receive signals near the thermal noise floor, typically down −120 dBm/MHz. The distance of transmission is limited by the radio noise floor:
Over the air;
In components inside the radio receiver; and
In the antenna and feeder cable.

Figure 3:
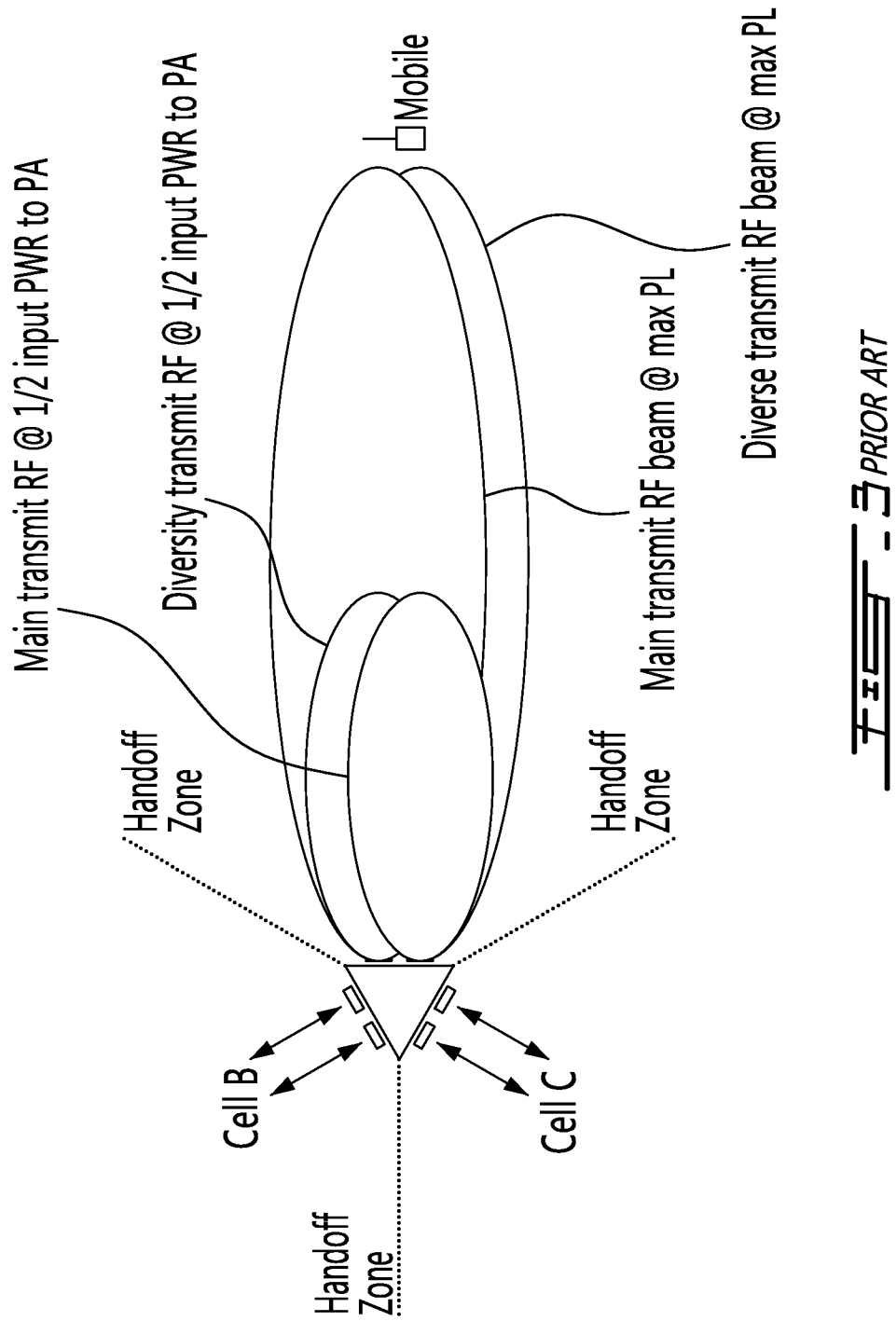
FIG. 3 is a diagram illustrating the effects of reducing input power of Power Amplifiers to cell site signal coverage.

As an example, and with reference to FIG. 3, if the power input to a PA is reduced by 50%, and because of the efficiency drop, the output is reduced a further 15%. The operating range in this scenario is reduced by a factor of $1/(2+0.15)^2=0.216$ or a 78% drop in coverage range.

Network service providers can request certain base stations to enter a power reduction mode when certain conditions exist by reducing or lowering the power class mode of the radio.

Currently base station radios switch power mode class by shutting off all the RF paths simultaneously as the RF power amplifiers are re-configured to operate at the new power class. This cut over induces a temporary outage thus is carefully managed especially during system operation. A power class change request from the network provider requires the radio control software to re-configure the power amplifiers' voltage bias to operate at the new transmit power level. The mobiles in this sector would see an abrupt outage and would start hunting for a new radio signal. This outage could last a number of seconds while the radio's power amplifier ramps up and the pre-distortion compensation is re-computed for the new output level.

The technique proposed in this disclosure implements the RF power class switching for radios with multiple transmit branches not all at once but rather by switching over the power class in a sequential way, that is, one transmit radio branch at a time. In this way, service to the mobiles continues to be uninterrupted since one of the radio branches is still operating, either at the old power class level or the newly applied power class level.

Using this technique, if the radio is being configured to operate at a lower power class then there will be no disruption in service. If it is to be operated at a higher power class, then overall RF output will be reduced as each RF branch is switched over. At least the radio will continue to provide uninterrupted service to affected mobiles.

The technique proposed in this disclosure implements a change in the RF amplifier power class by sequentially turning off the power amplifier on one of the radio's transmitter branches, switching its power class level, turning the power amplifier back on and repeating this for another power amplifier providing RF transmission diversity for a sector covered by the affected RF amplifiers. Once the diverse radio branch is operating at the new designated power class, then the main radio branch is switched over to the new power class. The connected mobile may observe a transitional change in received power level but the connection to the base station can be maintained. This minimizes service disruption to the mobiles connected to the base station over this radio link.

Figure 4:
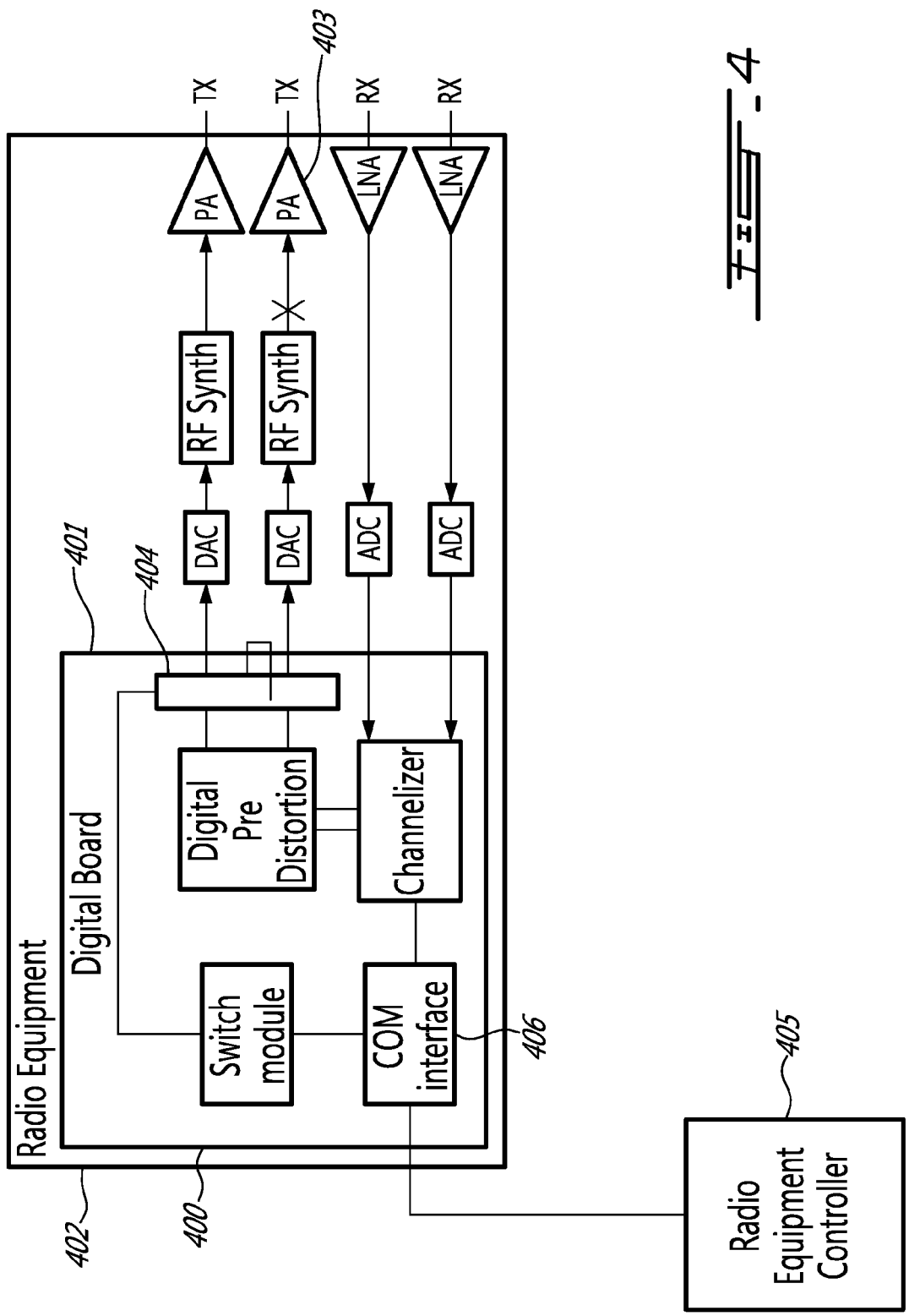
FIG. 4 is a block diagram of a radio base station according to the present invention.

This is illustrated in FIG. 4. By changing the power class alongside reducing power to that RF amplifier, the amplifier operates at better operating efficiencies.

A switch module 400 is configured with the digital board 401 of the Radio Equipment 402. The switch module 400 operates to turn off power to a power amplifier 403 via a switch 404. Switch 404 can be implemented in hardware under software control in the switch module 400 and digital board 401. The switch module 400 and switch 404 can be fully integrated with the existing radios as part of a remote service update conducted by the manufacturer or service provider. This way, a command received from the service provider can be delivered to the switch module 400 via the REC 405 and the communication interface 406.

By switching power off to a PA 403 of a diverse branch and then adjusting its power class, the radio's power consumption is reduced more efficiently then by reducing output power of each PA individually without a power class change. So instead of reducing the input power equally at each of the PAs, one is removed from service, while its power class is changed and the other PA continues to operate at the optimal output power.

For each radio to operate at a particular output energy level efficiently, a set of matching parameters are engineered such that when they are applied the radio will operate with maximal energy efficiency and reduce waste. For example when a radio is transmitting 10W with a 10W power class; it can consume up to 7% less energy than transmitting identical 10W but with a 20W power class. As far as a mobile is concerned the received power is identical but the energy saving at the base station can be important. This saving can be significant as the radios account for the majority of the equipment in a deployed network.

Also matching the power class to the output power level is important to ensure RF integrity. The power class defines the operating boundaries of the radio. When the radio is operating suboptimal either too high or too low, the RF characteristic distortion may be increased due to the RF branch is not operating in its engineered optimal range.

As illustrated in FIG. 5, the radio coverage is reduced when a PA is turned off since the gain from transmitter diversity is reduced. However, this is still more efficient than simply reducing a PA's output power. With this technique the energy saving impact on the wireless network will be more than the current power saving approach which operates the PAs at a lower non-optimal output. The radio implements sleep mode by turning off the RF output of a diverse radio branch. All carriers in this branch are released and the power to the branch's PA is turned off. The main RF branch remains operational at its optimal efficiency. Adjacent transmit patterns have minimal effect on one another. The base station radio optimizes power savings, by turning off the diverse PA but keeping the main PA operating at optimal output. There will be an approximate 3 dB drop in signal strength in the coverage area of the disabled beam. Once the diverse PA is operating at the new power class then it is the main radio branch PA's turn to switch power class.

In another embodiment, a change to a lower power class can be triggered to provide power savings during off-peak hours. During off-peak hours when there are less active mobiles and hence interference, then the base station radios can radiate at lower transmit powers. In current practice the radio output power is reduced evenly on all RF branches but in this case they no longer operate with optimal drain efficiency. By matching it with a lower power class ensures correct engineering parameters are applied and at the same time reduces power consumption of the base station radios. That translates to direct saving in Operational Expenditure. Before this invention the operator may decide to stay with suboptimal power class to avoid service interruption. This invention allows the operator a scheme to switch over without service interruption. In the following example the radio switches from the 20 watt power class to the 10 watt power class resulting in a power savings of 34%.

In another embodiment, a sleep mode condition can be triggered to provide high temperature and Power Amplifier failure recovery. In a radio equipment (RE) the PA is known to be one of its major heat generators. As indicated above, matching the power class to the expected output power results in maximal drain efficiency. In this case the energy waste is controlled and consequently reducing waste energy lowers the overall heat generation. This embodiment allows one or more of its PA the freedom to match power class with the output power resulting in lower heat dissipation.

This satisfies the self-healing aspect of the Self Organizing Network.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Thus, one embodiment is a computer readable medium containing computer readable instruction that, when executed by a processor, cause the processor to perform functions for maintaining clock synchronization between a first and a second radio.

In addition, unless mention was made above to the contrary, it should be noted that all of the accompanying drawings are not to scale. It will be appreciated by persons skilled in the art that the present invention is not limited to what has been particularly shown and described herein above. A variety of modifications and variations are possible in light of the above teachings without departing from the scope and spirit of the invention, which is limited only by the following claims.

We claim:

1. A base station radio having a number of multi-carrier power amplifiers with multiple RF Power Classes to provide signal diversity at a cell site, said base station radio being operable to provide an on-demand RF Power class change, comprising:
  a) a first multi-carrier power amplifier with multiple RF Power Classes for providing a main RF beam transmission at one sector of said cell site;
  b) a second multi-carrier power amplifier with multiple RF Power Classes for providing RF beam transmission diversity to said main RF beam transmission; and
  c) a switch operable to disable either said first or second multi-carrier power amplifier when an RF Power class change is required.

2. A base station radio as defined in claim 1, wherein said Power class change is required said switch disables either of said first or second multi-carrier power amplifier for each sector of said cell site in order to switch RF power class of a disabled RF power amplifier.

3. A base station radio as defined in claim 1, wherein said RF power class change is triggered to provide automatic radio interference reduction such that said switch disables one or more multi-carrier power amplifiers to switch RF power class and reduce adjacent sector interference in an affected region of said cell site.

4. A base station radio as defined in claim 1, wherein said RF power class change is triggered to provide reduced power consumption during off-peak hours at said cell site by switching one or more multi-carrier power amplifiers to a lower RF power class.

5. A base station radio as defined in claim 1, wherein said RF power class change is triggered when one or more of said multi-carrier power amplifiers is affected by a high temperature alarm such that the affected power amplifier is switched to a lower RF power class to allow the radio to cool down.

6. A base station radio as defined in claim 1, wherein said switch is implemented in hardware and an action associated with said RF power class change is triggered upon receipt of a software instruction at said radio.

7. A method of implementing an on-demand change of the RF power class of multi-carrier power amplifiers at a base station radio operating at a cell site, comprising the steps of:
   a) Operating a first multi-carrier amplifier for providing a main RF beam transmission at one sector of said cell site, said first multi-carrier amplifier operating at a specified RF power class;
   b) Operating a second multi-carrier amplifier for providing RF beam transmission diversity to said main RF beam transmission, said second multi-carrier amplifier operating at said specified RF power class; and
   c) activating a switch to alternately disable either said first or second multi-carrier power amplifier when change in RF power class is required for said first and second multi-carrier power amplifiers.

8. A method as defined in claim 7, wherein said switch is activated to change the RF power class of said first and second multi-carrier power amplifier for each sector of said cell site in order to reduce power consumption at said cell site.

9. A method as defined in claim 7, wherein said change of RF power class is activated to provide automatic radio interference reduction and wherein said switch is activated to a lower RF power class for one or more multi-carrier power amplifiers to reduce adjacent sector interference in an affected region of said cell site.

10. A method as defined in claim 7, wherein a change in RF power class is triggered to provide reduced power consumption during off-peak hours at said cell site.

11. A method as defined in claim 7, wherein a change in RF power class is triggered when one or more of said multi-carrier power amplifiers is affected by a high temperature alarm and wherein said switch is activated to lower the RF power class of the affected power amplifier to allow the radio to cool down.

12. A method as defined in claim 7, wherein the step of activating a switch is implemented in hardware and an action associated with changing the RF power class is triggered upon receipt of a software instruction at said radio.

13. A method of implementing an on-demand change of the RF power class of multi-carrier power amplifiers at a base station radio operating at a cell site, said power amplifiers providing signal diversity at said cell site comprising the steps of:
   a) sending an RF power class change request to said base station radio;
   b) switching off a first power amplifier to enable a change to a new RF power class for said first power amplifier;
   c) switching said first power amplifier back on at said new RF power class;
   d) switching off a second power amplifier providing transmission diversity with said first power amplifier to enable a change to said new RF power class; and
   switching said second power amplifier back on at said new RF power class.

\* \* \* \* \*

UNITED STATES PATENT AND TRADEMARK OFFICE
CERTIFICATE OF CORRECTION

PATENT NO. : 8,818,444 B2  
APPLICATION NO. : 13/554368  
DATED : August 26, 2014  
INVENTOR(S) : Iun et al.

Page 1 of 1

It is certified that error appears in the above-identified patent and that said Letters Patent is hereby corrected as shown below:

In the specification

In Column 3, Line 26, delete "RE 102" and insert -- RE 100 --, therefor.

In Column 3, Lines 59-60, delete "radio (RE) 102" and insert -- radio (RE) 100 --, therefor.

In Column 4, Line 60, delete "FIG. 4. By" and insert -- FIG. 4, by --, therefor.

In the claims

In Column 8, Line 35, in Claim 13, delete "switching" and insert -- e) switching --, therefor.

Signed and Sealed this
Twenty-fourth Day of May, 2016

Michelle K. Lee
*Director of the United States Patent and Trademark Office*